Patented May 19, 1931

1,806,260

UNITED STATES PATENT OFFICE

KARL JUNGMANN, OF AUSSIG, AND OSWALD KOLBERT, OF NESTOMITZ, CZECHO-SLOVAKIA

PROCESS FOR THE PRODUCTION OF SOLID ALCOHOLIC IODINE SOLUTIONS IN PENCIL FORM AS A SUBSTITUTE FOR TINCTURE OF IODINE

No Drawing. Application filed July 11, 1927, Serial No. 205,029, and in Germany September 21, 1926.

The problem, forming the basis of the invention, is to provide a solid and permanent alcoholic iodine solution in the form of a rubbing pencil, to take the place of the liquid tincture of iodine heretofore used.

There are already known processes of forming solid alcoholic iodine solutions, which consist in adding iodine or an iodine solution to solid alcohol hardened by sodium stearate or sodium palmitate. But such solid iodine solutions are not permanent, since, in consequence of a reaction of the free iodine with the sodium stearate or palmitate, solidifying the alcohol, the iodine is gradually used up, on the one hand, and on the other, the solid iodine solution gradually liquefies or loses its solidity.

Also durable iodine pencils for application to the skin are also already known. But these pencils do not contain the iodine in a very active alcoholic solution, but in other media.

The invention enables the formation of a durable alcoholic tincture of iodine in pencil form and therefore combines the advantages of the alcoholic solution with that of durability and in a solid aggregate condition.

In accordance with the invention, such a durable alcoholic tincture of iodine in pencil form can be obtained by adding, to the mixture of solid alcohol with iodine or an iodine solution or to the components of this mixture or even to a component in the formation of the solid alcohol, substances which are capable of combining the iodine in a rather unstable condition, i. e., of forming, with iodine adsorption, addition, or complex compounds, or compounds which again readily liberate the iodine. The iodine is thus combined in the solid solution and, as a result, its reaction with the medium, solidifying the alcohol, is prevented or largely neutralized. Only when the stick is applied to the skin is the meta-stable combined iodine liberated.

The meta-stable combination of the iodine can be obtained, for example, by salts of the halogens. The addition of the iodides, used with liquid tincture of iodine, is particularly well adapted, and, in general, water-soluble iodines are suitable for the desired purpose, such as, sodium, potassium, lithium and magnesium iodides, etc.

If, for example, an alcohol, solidified by the aid of sodium stearate, is used, no reaction of the free iodine takes place, when sodium iodide, for example, is incorporated in the product in such quantities that almost all the iodine is combined meta-stablely. The greater the addition of iodide, the more the reaction of the iodine with the solidifying agent is prevented and the product is the more durable. Only by the addition of a sufficient quantity of substances, which combine iodine in a rather unstable condition within the scope of the present invention, is it possible to form a durable alcoholic iodine pencil, notwithstanding a high content of free iodine.

Since the meta-stable combination of the iodine is largely destroyed by heat and the formation must take place with heat, the undesired reaction of the iodine with the solidifying agent, with the addition of stabilizers in accordance with the invention, must occur to a certain degree. To limit this reaction to a minimum, it is advisable to cool the completed mixture as rapidly as possible.

Example 46 g. pure stearic acid are dissolved with heat in 800 cm³ alcohol. At the same time, 3.68 g. metallic sodium are dissolved in 200 cm³ alcohol, forming sodium alcoholate. The two solutions are combined at a temperature of about 65°–70° C. and 30 g. sodium iodide are added to the mixture. To the hot mixture is added a solution of 20 g. iodine in 200 g. alcohol, while the mixture is being stirred. It is then poured into glass tubes as rapidly as possible and cooled quickly. The result is about 1 kg. of solid tincture of iodine.

What we claim is:—

1. Process for making a solid stable alcoholic solution of iodine in pencil form as a substitute for tincture of iodine, said process consisting in melting solidified alcohol by means of heat, adding iodine and a water-soluble iodide to said molten product, the amount of iodide added being sufficient to prevent subsequent liquefaction of the alcoholic solution after it congeals and to produce the desired rubbing consistency when congealed, causing the alcoholic solution to congeal due to reduction of its temperature, the iodine being added to the solution only shortly before it congeals, and forming the congealed product into pencils.

2. Process for making a solid stable alcoholic solution of iodine in pencil form as a substitute for tincture of iodine, said process consisting in dissolving a water-soluble soap in alcohol by means of heat, adding iodine and a water-soluble iodide to said solution, the amount of iodide added being sufficient to prevent subsequent liquefaction of the alcoholic solution after it congeals and to produce the desired rubbing consistency when congealed, causing the alcoholic solution to congeal due to reduction of its temperature, the iodine being added to the solution only shortly before it congeals, and forming the congealed product into pencils.

3. Process in accordance with claim 2, wherein the stabilizer is sodium iodide and the water-soluble soap is sodium stearate.

4. Process in accordance with claim 2, wherein the stabilizer is sodium iodide and the water-soluble soap is sodium palmitate.

5. Process for making a solid stable alcoholic solution of iodine in pencil form as a substitute for tincture of iodine, said process consisting in dissolving a water-soluble soap in alcohol by means of heat, adding iodine to said solution, some of said iodine thereupon reacting with some of the soap to produce a water-soluble iodide sufficient in amount to act as a stabilizer to prevent subsequent liquefaction of the alcoholic solution after it congeals and to produce the desired rubbing consistency of the final product when congealed, causing the alcoholic solution to congeal due to reduction of temperature, the iodine being added to the solution only shortly before it congeals, and forming the congealed final product into pencils.

In testimony whereof we have signed our names to this specification.

DR. ING. KARL JUNGMANN.
DR. ING. OSWALD KOLBERT.